United States Patent
Deng et al.

(10) Patent No.: US 11,916,343 B2
(45) Date of Patent: Feb. 27, 2024

(54) CURRENT TRANSFERRING DEVICE FOR AN ELECTRIC MACHINE AND AN ELECTRIC MACHINE WITH THE SAME, AND A VEHICLE

(71) Applicant: FORD GLOBAL TECHNOLOGIES, LLC, Dearborn, MI (US)

(72) Inventors: Chuan Deng, Nanjing (CN); Guohua Du, Nanjing (CN); Yigang Yuan, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 17/622,039

(22) PCT Filed: Jul. 2, 2020

(86) PCT No.: PCT/US2020/040645
§ 371 (c)(1),
(2) Date: Dec. 22, 2021

(87) PCT Pub. No.: WO2021/003360
PCT Pub. Date: Jan. 7, 2021

(65) Prior Publication Data
US 2022/0255277 A1   Aug. 11, 2022

(30) Foreign Application Priority Data
Jul. 2, 2019   (CN) .......................... 201910588682.5

(51) Int. Cl.
*H01R 39/64*   (2006.01)
*H01R 39/10*   (2006.01)
*H02K 13/00*   (2006.01)

(52) U.S. Cl.
CPC ........... *H01R 39/646* (2013.01); *H01R 39/10* (2013.01); *H02K 13/003* (2013.01); *H01R 2201/26* (2013.01)

(58) Field of Classification Search
CPC .. H01R 39/646; H01R 39/10; H01R 2201/26; H01R 3/08; H01R 2201/10; H02K 13/003; H02K 13/00
See application file for complete search history.

(56) References Cited

U.S. PATENT DOCUMENTS 3,168,666 A   2/1965   Grobel
3,436,575 A   4/1969   Harvey
(Continued)

FOREIGN PATENT DOCUMENTS

CN   2697938 Y   5/2005
CN   102684027 A   9/2012
(Continued)

OTHER PUBLICATIONS

KR2014064595A English translation (Year: 2023).*
(Continued)

*Primary Examiner* — Christopher M Koehler
*Assistant Examiner* — Viswanathan Subramanian
(74) *Attorney, Agent, or Firm* — David B. Kelley; Brooks Kushman P.C.

(57) ABSTRACT

There is provided a current transferring device for an electric machine comprising a rotary bearing member fixed in a rotor shaft and rotating with it and a non-rotary component. The rotary bearing member includes a first compartment filled with a conducting fluid and having a first opening and a rotor positive connector that is in electrical contact with the conducting fluid therein and electrically connected to a rotor positive pole, and a second compartment filled with a conducting fluid and electrically insulated from the first (Continued)

compartment and having a second opening and a rotor negative connector that is in electrical contact with the conducting fluid therein and electrically connected to a rotor negative pole. The non-rotary component closes the first and second openings.

16 Claims, 3 Drawing Sheets

(56) References Cited

U.S. PATENT DOCUMENTS

| | | | | |
|---|---|---|---|---|
| 3,444,408 | A * | 5/1969 | Krulls | H01R 39/646 310/227 |
| 3,835,436 | A * | 9/1974 | Klaudy | H01R 39/646 439/190 |
| 4,156,155 | A * | 5/1979 | Cannell | H02K 31/04 310/191 |
| 4,171,496 | A * | 10/1979 | Eriksson | H01R 39/646 310/67 R |
| 7,019,431 | B1 * | 3/2006 | Kerlin | H01R 39/646 310/232 |
| 9,762,094 | B2 | 9/2017 | Guina | |
| 2003/0129855 | A1 | 7/2003 | Douglas | |
| 2010/0007237 | A1 * | 1/2010 | Nies | H01R 39/646 290/55 |
| 2015/0214824 | A1 | 7/2015 | Guina | |

FOREIGN PATENT DOCUMENTS

| | | |
|---|---|---|
| DE | 102006011256 A1 | 9/2007 |
| KR | 200174130 Y1 | 3/2000 |
| KR | 2014064595 A * | 5/2014 |
| WO | 200122558 A2 | 3/2001 |
| WO | 2014040145 A1 | 3/2014 |

OTHER PUBLICATIONS

International Preliminary Report on Patentability and Written Opinion of the International Searching Authority for PCT/US2020/040645 dated Jan. 13, 2022, 8 pages.

PCT Search Report for PCT/US2020/040645 dated Aug. 29, 2020. 3 pages.

Compact Rotor Power Transfer in Wound Rotor Synchronous Motor (WR-SM) for High Performance Electric Vehicles, Yujing Liu. 4 pages.

* cited by examiner

CURRENT TRANSFERRING DEVICE FOR AN ELECTRIC MACHINE AND AN ELECTRIC MACHINE WITH THE SAME, AND A VEHICLE

CROSS-REFERENCE TO RELATED APPLICATIONS

This application is the U.S. national phase of PCT Application No. PCT/US2020/040645, filed Jul. 2, 2020, which claims priority to CN 2019 105 886 825, filed Jul. 2, 2019, the disclosures of which are hereby incorporated by reference in their entirety.

TECHNICAL FIELD

The present invention generally relates to electrical technology field and, more particularly, to a current transferring device for an electric machine, an electric machine with the same and a vehicle.

BACKGROUND

Existing electric machines generally include two parts: a rotor and a stator, serving as energy conversion devices for converting electrical energy into mechanical energy and converting mechanical energy into electrical energy. In some structures of the electric machines, it is necessary to transfer direct current from a power source to a rotor winding of the rotor of the electric machine or the reverse, to generate an electric field, and then the rotor can rotate under a rotating magnetic field of the stator of the electric machine.

The process of transferring direct current from the power source to the rotor winding of the rotor of the electric machine or the reverse involves current transferring between moving parts. Currently, the technical solutions mainly used in the art include mechanical slip ring transferring, rotary transformer transferring, capacitive power transferring, and resonant power transferring. Among them, the mechanical slip ring transferring has higher loss, while the rotary transformer transferring, the capacitive power transferring and the resonant power transferring have complex structures and higher costs.

Chinese patent document CN2697938Y discloses a fluid exciting current-leading system, in which a solution of transferring current through a conducting fluid is mentioned. In said fluid exciting current-leading system, the exciting current flows from a positive or negative pole of a power supply to a stationary good conductor, and then pass a good conductor liquid to a good conductor on a rotating shaft, and then to a rotor winding of a generator, wherein a rotating good conductor device is installed on the rotating shaft of the generator and rotates along with the rotating shaft, a stationary good conductor device is installed on the periphery of the rotating good conductor, a cavity is formed between the rotating good conductor device and the stationary good conductor device, and the good conductor liquid fills the cavity. In this structure, the rotating good conductor device, the stationary good conductor device and the good conductor liquid are all arranged outside the rotating shaft of the generator, the overall structure is thus relatively large and susceptible to external influences.

Against this background, the inventor of the present application recognized that there is a need for a current transferring device for an electric machine which can transfer current to the rotor winding through a conducting fluid, and which is more compact and reliable than the existing conducting fluid transferring structures and can avoid the external influences to the greatest extent.

STATEMENTS OF INVENTION

The disclosure summarizes aspects of the embodiments and should not be used to limit the claims. Other implementations are contemplated in accordance with the techniques described herein, as will be apparent upon examination of the following drawings and detailed description, and such implementations are intended to be within the scope of this application.

The advantage of the present invention is to provide a current transferring device for an electric machine, which is more compact and reliable than the existing conducting fluid transferring structures, and can avoid the external influences to the greatest extent.

According to the present invention, there is provided a current transferring device for an electric machine comprising:

a rotary bearing member fixed in a rotor shaft and rotating with it, the rotary bearing member including:
a first compartment filled with a conducting fluid, the first compartment having a first opening and a rotor positive connector that is in electrical contact with the conducting fluid therein and electrically connected to a rotor positive pole;
a second compartment filled with a conducting fluid and electrically insulated from the first compartment, the second compartment having a second opening and a rotor negative connector that is in electrical contact with the conducting fluid therein and electrically connected to a rotor negative pole; and
a non-rotary component closing the first and second openings including:
a power positive connector extending into the first compartment and being in electrical contact with the conducting fluid therein;
a power negative connector extending into the second compartment and being in electrical contact with the conducting fluid therein.

According to an embodiment of the present invention, the rotary bearing member includes a first portion and a second portion separated from each other, the first portion includes the first compartment and has the first opening, and the second portion includes the second compartment and has the second opening.

According to an embodiment of the present invention, the non-rotary component further includes a closing component abutting edges of the first and second openings, and the power positive connector and the power negative connector extend through the closing component.

According to an embodiment of the present invention, the first opening and the second opening face opposite axial directions.

According to an embodiment of the present invention, the first opening and the second opening face the same axial direction.

According to an embodiment of the present invention, the non-rotary component further includes fluid sealing structures respectively provided at the junction with the first opening and the junction with the second opening.

According to an embodiment of the present invention, the non-rotary component further includes a rotary bearing abutting the rotary bearing member.

According to an embodiment of the present invention, the rotary bearing member is made of metal and coated with an insulating coating on the surface that contact with the conducting fluid.

According to an embodiment of the present invention, the rotary bearing member is made of insulating plastic.

According to an embodiment of the present invention, wherein the conducting fluid includes a conducting solution or a liquid metal.

According to the present invention, there is provided an electric machine comprising:

a rotor having a rotor winding and a rotor shaft containing an inner cavity, the rotor winding having a rotor positive pole and a rotor negative pole; and a current transferring device including:

a rotary bearing member fixed in the inner cavity and rotating with the rotor shaft, the rotary bearing member including:

a first compartment filled with a conducting fluid, the first compartment having a first opening and a rotor positive connector that is in electrical contact with the conducting fluid therein and electrically connected the rotor positive pole;

a second compartment filled with a conducting fluid and electrically insulated from the first compartment, the second compartment having a second opening and a rotor negative connector that is in electrical contact with the conducting fluid therein and electrically connected to the rotor negative pole; and a non-rotary component closing the first and second openings including:

a power positive connector extending into the first compartment and being in electrical contact with the conducting fluid therein;

a power negative connector extending into the second compartment and being in electrical contact with the conducting fluid therein.

According to an embodiment of the present invention, the rotary bearing member includes a first portion and a second portion separated from each other, the first portion includes the first compartment and has the first opening, and the second portion includes the second compartment and has the second opening.

According to an embodiment of the present invention, the non-rotary component further includes a closing component abutting the edges of the first and second openings, and the power positive connector and the power negative connector extend through the closing component.

According to an embodiment of the present invention, the first opening and the second opening face opposite axial directions.

According to an embodiment of the present invention, the first opening and the second opening face the same axial direction.

According to an embodiment of the present invention, the non-rotary component further includes fluid sealing structures respectively provided at the junction with the first opening and the junction with the second opening.

According to an embodiment of the present invention, the non-rotary component further includes a rotary bearing abutting the rotary bearing member.

According to an embodiment of the present invention, the rotary bearing member is made of metal and coated with an insulating coating on the surface that contact with the conducting fluid.

According to an embodiment of the present invention, the rotary bearing member is made of insulating plastic.

According to the present invention, there is provided a motor vehicle comprising the electric machine as described above.

BRIEF DESCRIPTION OF THE DRAWINGS

For a better understanding of the present invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION

Embodiments of the present disclosure are described below. However, it should be understood that the disclosed embodiments are only examples, and other embodiments may take various alternative forms. Drawings are not necessarily drawn to scale; and some functions may be exaggerated or minimized to show details of specific components. Therefore, the specific structural and functional details disclosed herein should not be interpreted as restrictive, but merely as a representative basis for teaching those skilled in the art to use the invention in various ways. As will be understood by those of ordinary skill in the art, various features shown and described with reference to any one of the drawings may be combined with features shown in one or more other drawings to produce embodiments which is not explicitly shown or described. The combination of the features shown provides a representative embodiment for a typical application. However, various combinations and modifications of features consistent with the teachings of the present disclosure may be expected for certain specific applications or embodiments.

In order to make the structure of the current transferring device used in the electric machine more compact and reliable and avoid the external influences to the greatest extent, the present invention provides a current transferring device 100 for the electric machine. A block diagram of an electric machine 220 including a current transferring device 100 is shown in FIG. 1.

Figure 1:
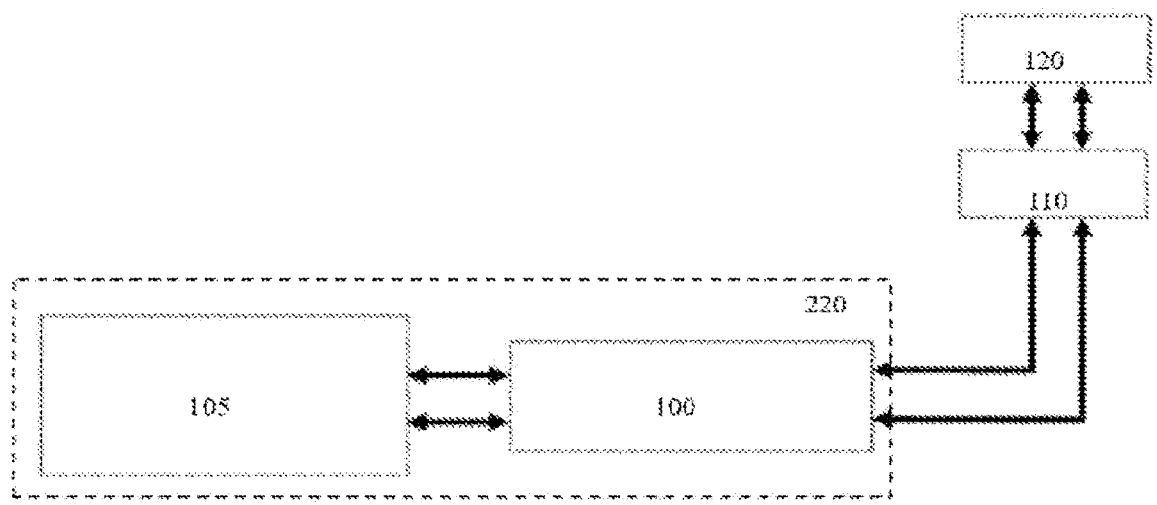
FIG. 1 shows a block diagram of an electric machine including a current transferring device for an electric machine according to an embodiment of the present invention, in which the electric machine is connected to a power source through a DC-DC converter.
Figure 2:
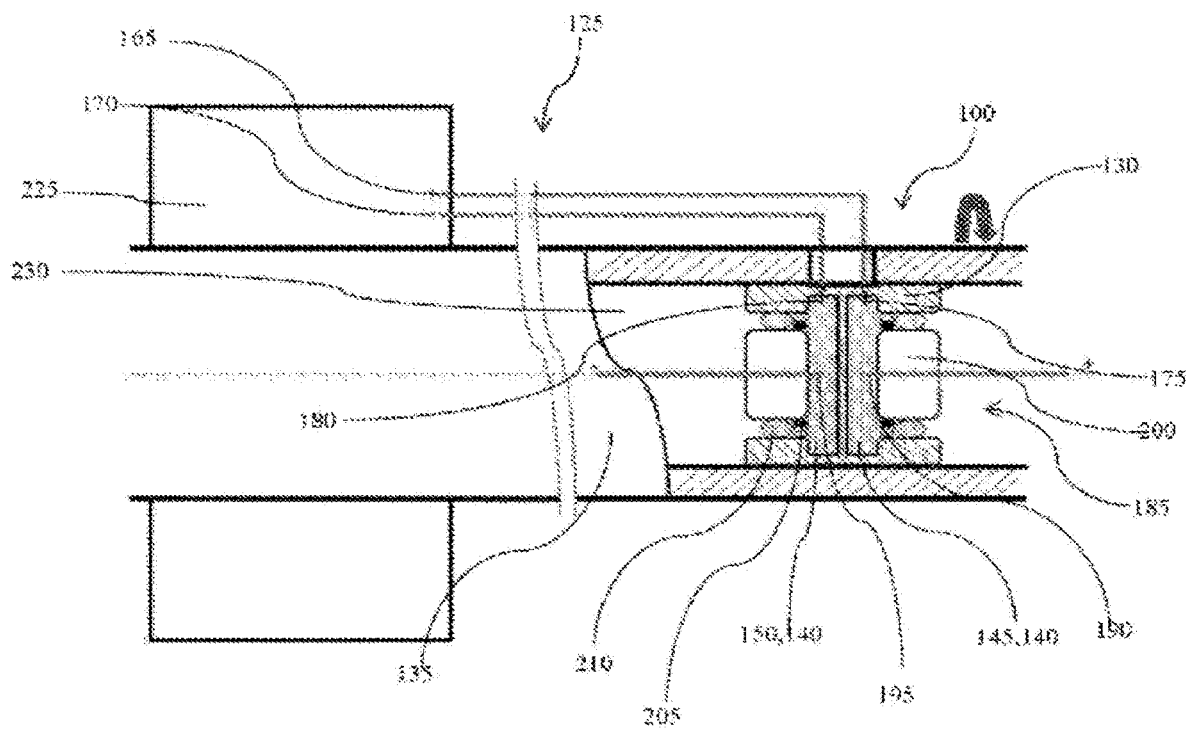
FIG. 2 shows a schematic cross-sectional view of a current transferring device for an electric machine according to an embodiment of the present invention.
Figure 3:
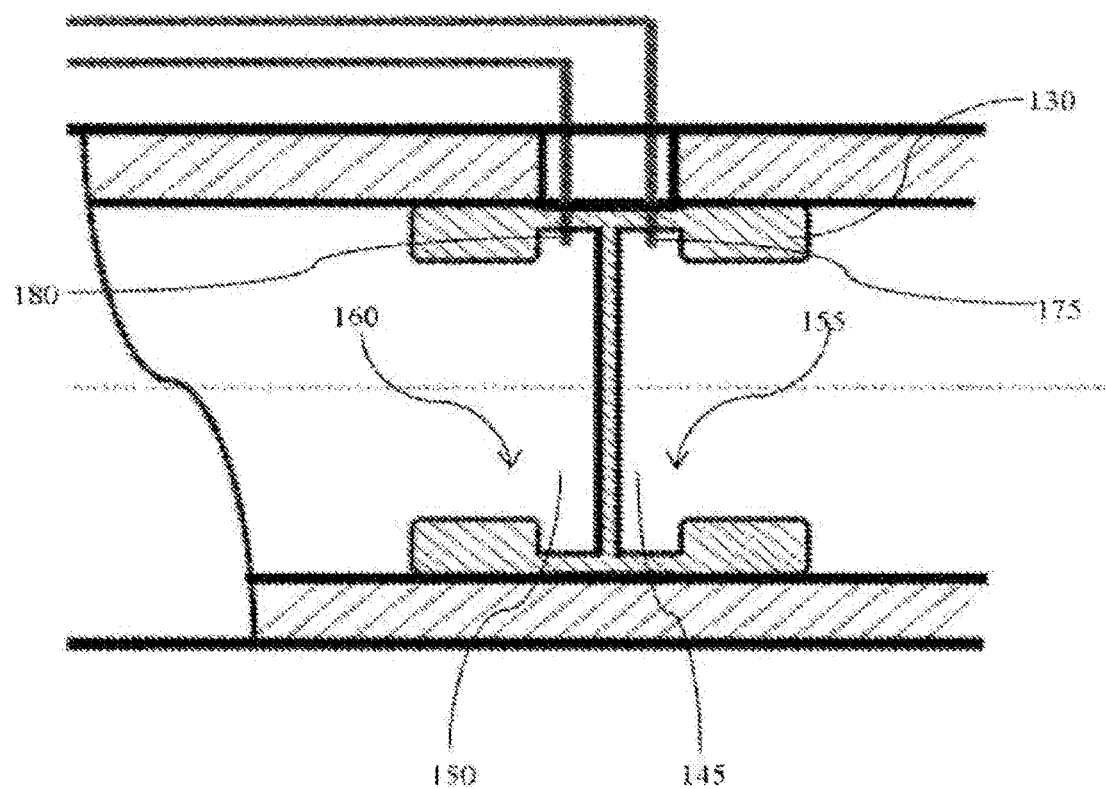
FIG. 3 shows an enlarged schematic view of a rotary bearing member in a current transferring device for an electric machine according to an embodiment of the present invention, with the components contained therein removed for clarity.

With continued reference to FIG. 1, reference then is made to FIGS. 2 and 3 which show a schematic diagram of a current transferring device 100 for an electric machine according to an embodiment of the present invention and an enlarged view of a rotary bearing member therein, with the components contained therein removed in the enlarged view of FIG. 3 for clarity. As can be seen from the figures, the current transferring device 100 for an electric machine comprises a rotary bearing member 130 and a non-rotary component 185. The rotary bearing member 130 is fixed inside a rotor shaft 135 of the electric machine 220 and rotates with the rotor shaft 135. The rotary bearing member 130 includes a first compartment 145 and a second compartment 150 inside it. Wherein, as more clearly shown in FIG. 3, the first compartment 145 has a first opening 155 and has a rotor positive connector 175 inside it, the rotor positive connector 175 is electrically connected to the rotor positive pole 165 through the rotary bearing member 130. The interior of the first compartment 145 is filled with a conducting fluid 140, and the conducting fluid 140 is in electrical contact with the rotor positive connector 175. The second compartment 150 has a second opening 160 and has a rotor negative connector 180 inside it, and the rotor negative connector 180 is electrically connected to the rotor negative pole 170 through the rotary bearing member 130. The interior of the second compartment 150 is filled with a conducting fluid 140 and the conducting fluid 140 is in electrical contact with the rotor negative connector 180. Wherein, the first compartment 145 is electrically insulated from the second compartment 150, so that the respective conducting fluid 140 inside the first compartment 145 and the second compartment 150 are electrically insulated and separated. The non-rotary component 185 closes the first opening 155 and the second opening 160, and includes a power positive connector 190 and a power negative connector 195. The power positive connector 190 extends into the first compartment 145 and is in electrical contact with the conducting fluid 140 in the first compartment 145. The power negative connector 195 extends into the second compartment 150 and is in electrical contact with a conducting fluid 140 in the second compartment 150.

As shown in FIGS. 1 and 2, according to some embodiments of the present invention, in the assembled state, the current transferring device 100 for an electric machine is located in a cavity 230 of the rotor shaft 135, and the rotor positive connector 175 and the rotor negative connector 180 thereof are respectively connected to the rotor positive pole 165 and the rotor negative pole 170 of a rotor winding 105 of a rotor 125 the electric machine. The rotary bearing member 130 and its rotor positive connector 175 and rotor negative connector 180 are fixed to the rotor shaft 135 and can rotate with the rotor shaft 135 and the rotor winding 105. The non-rotary component 185 and the power positive connector 190 and the power negative connector 195 remain stationary relative to the rotor shaft 135. Between the power positive connector 190 and the rotor positive connector 175 and between the power negative connector 195 and the rotor negative connector 180, a current is transferred through the conducting fluid 140. During the operation of the electric machine 220, the rotor winding 105 receives electrical energy from a power supply 120 or transfers electrical energy to the power supply 120 via a DC-DC converter (DC-DC) 110 through a current transferring device 100 for an electric machine. It can be understood by those skilled in the art that the concept of the invention is not limited to the components shown in the drawings, for example, the DC-DC converter 110 may not exist.

The shapes and relative positions of the components, such as the rotary bearing member 130, the first compartment 145 and the second compartment 150, and the non-rotary component 185 shown in the drawings are not intended to be limited, but only as one of the embodiments in which the invention can be implemented. For example, the rotor positive connector 175 and the rotor negative connector 180, as well as the power positive connector 190 and the power negative connector 195 may be reduced to an electrical contact flush with or slightly protruding from the inner surface of the non-rotary component 185 or its enclosed member 200 and the inner surface of the first compartment 145 or the second compartment 150, without having to extend a distance into the conducting fluid 140 as shown in the figure; of course, it can extend further into the conducting fluid 140, The rotor positive connector 175 and the rotor negative connector 180, as well as the power positive connector 190 and the power negative connector 195 may be combined with the rotary bearing member 130 and the non-rotary component 185 by means of fixation such as welding, riveting, shape matching, etc., so as to ensure sufficient tightness so that the conducting fluid 140 will not leak.

In addition, the first compartment 145 and the second compartment 150 can be filled completely or partially by the conducting fluid 140, which can be changed by those skilled in the art dependent on the structure, cost, assembly requirements and other factors without departing from the scope of the present disclosure. According to some embodiments of the present invention, the first compartment 145 and the second compartment 150 are completely filled by the conducting fluid 140.

Figure 4:
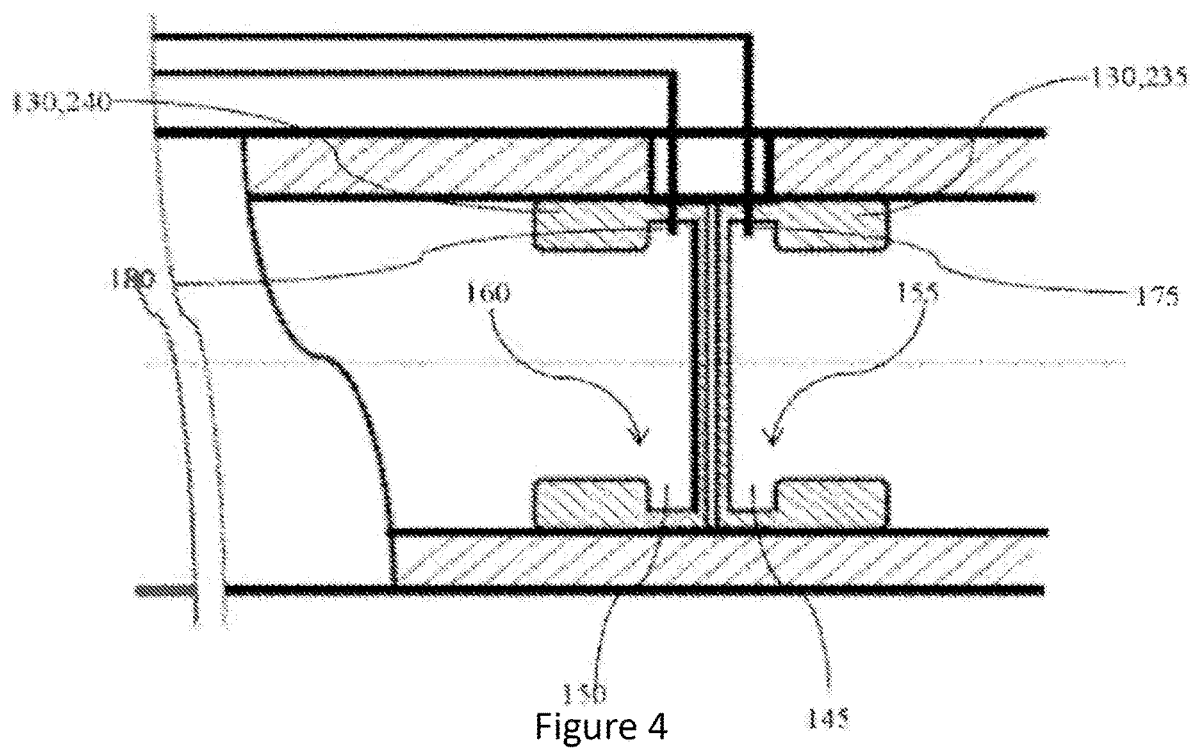
FIG. 4 shows an enlarged schematic view of a rotary bearing member in a current transferring device for an electric machine according to another embodiment of the present invention, with the components contained therein removed for clarity.

Moreover, those skilled in the art can understand that the non-rotary component 185 can be an integral part including a power positive connector 190 and a power negative connector 195, and simultaneously close the first opening 155 and the second opening 160, as shown in the embodiment of FIG. 4; alternatively, the non-rotary component 185 may also include two separate parts, which close the first opening 155 and the second opening 160, respectively, and are provided with a power positive connector 190 and a power negative connector 195, respectively, as shown in the embodiment of FIG. 2.

With reference to FIG. 4 next, a rotary bearing member 130 in a current transferring device for an electric machine according to another embodiment of the present invention is shown, with the components contained therein removed for clarity. According to some embodiments of the present invention, the rotary bearing member 130 may include a first portion 235 and a second portion 240 separated from each other. In this embodiment, the first portion 235 includes a first compartment 145 and has a first opening 155 and a rotor positive connector 175, and the second portion 240 includes a second compartment 150 and has a second opening 160 and a rotor negative connector 180. In this embodiment, the positions of the rotor positive connector 175 and the rotor negative connector 180 can be provided more flexibly without being limited to the same position.

Figure 5:
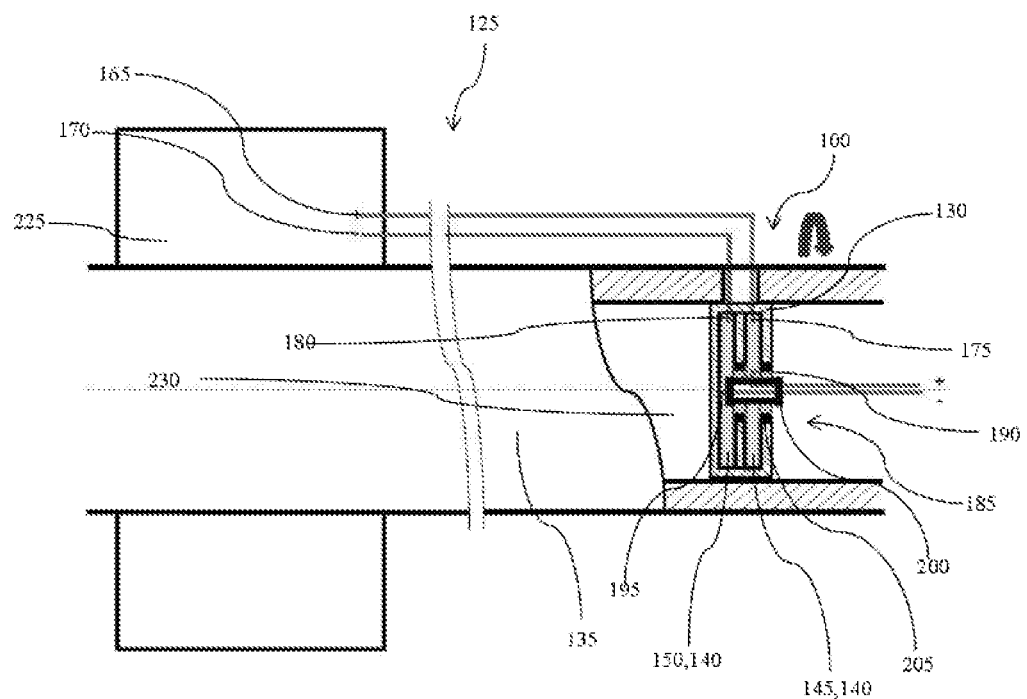
FIG. 5 shows a schematic cross-sectional view of a current transferring device for an electric machine according to yet another embodiment of the present invention.

According to an embodiment of the invention, the non-rotary component 185 further includes a closing component 200 abutting the edges of the first opening 155 and the second opening 160. Each of the power positive connector 190 and the power negative connector 195 extends through the closing component 200. It can be seen from the drawings that the number of the closing component 200 may be one (as shown in the embodiment of FIG. 5) or multiple (as shown in the embodiment of FIG. 2) The presence of the closing component 200 enables the power positive connector 190 and the power negative connector 195 to be fixed more reliably, and enables the first opening 155 and the second opening 160 to be closed better, to prevent the conducting fluid 140 from leaking. It can be understood by those skilled in the art that the non-rotary component 185 should be made of insulating material, such as insulating plastic, insulating ceramic material or metal material coated with insulating coating, etc.

According to some embodiments of the present invention, the first opening 155 faces one end of the rotor shaft 135, and the second opening 160 faces the other end of the rotor shaft 135, that is to say, the first opening 155 and the second opening 160 face opposite axial directions. In this case, the power positive connector 190 and the power negative connector 195 extend from opposite directions into the rotor shaft and respectively into the first compartment 145 and the second compartment 150 so as to contact with the conducting fluid 140 stored therein, and the specific structure is shown in FIG. 2. In this structure, the alignment requirement for assembling the non-rotary component 185 into the rotary bearing member 130 is relatively low, and when the rotary bearing member 130 rotates, the power positive connector 190 and the power negative connector 195 extending into the conducting fluid 140 cause less disturbance in the respective conducting fluid 140.

In some other embodiments of the present invention, the rotary bearing member 130, the power positive connector 190 and the power negative connector 195 are arranged coaxial with each other. In this structure, when the rotary bearing member 130 rotates, the power positive connector 190 and the power negative connector 195 are located on the rotation axis and in the middle of the first compartment 145 and the second compartment 150. This can further reduce the disturbance caused by the extended power positive connector 190 and the power negative connector 195 in the respective conducting fluid 140.

According to an embodiment of the present invention, the first opening 155 and the second opening 160 face the same end of the rotor shaft 135. That is to say, the first opening 155 and the second opening 160 face the same axial direction. According to a further embodiment, the non-rotary component 185 may be an integral part including both the power positive connector 190 and the power negative connector 195 passing through it, and simultaneously closes the first opening 155 and the second opening 160 on the same side. In this structure, the wire connecting the power supply 120 or the DC-DC converter 110 enters into the rotor shaft 135 through the same side, which thus makes wiring more convenient and reduces assembly cost.

In other embodiments of the present invention, the non-rotary component 185 also includes a number of fluid sealing structures 205, and the fluid sealing structures 205 are respectively arranged at the junction of the non-rotary component 185 and the first opening 155 and the junction of the non-rotary component 185 and the second opening 160. In this case, the non-rotary component 185 seals the conducting fluid 140 in the first compartment 145 and the second compartment 150 through the fluid sealing structures 205. The fluid sealing structures 205 may adopt such as magnetic fluid sealing technology, which can achieve better sealing performance between the rotary bearing member 130 and the non-rotary component 185 that rotate relative to each other, and ensure that the conducting fluid 140 will not leak to the greatest extent. Of course, those skilled in the art can understand that the protection scope of the invention is not limited to the fluid sealing structures 205, and other suitable sealing technologies can also be adopted in other embodiments.

According to several embodiments of the present invention, the non-rotary component 185 also includes a rotary bearing 205 located between the non-rotary component 185 or its closing component 200 and the rotary bearing member 130 and abutting the rotary bearing member 130, as shown in FIG. 2. In some further embodiments, the first opening 155 and the second opening 160 each abut a rotary bearing 205 arranged outside of the sealing structures. It can be understood by those skilled in the art that the rotary bearing 205 may be a ball bearing, a cylindrical bearing, a tapered bearing, etc. The rotary bearing 205 arranged between the non-rotary component 185 and the rotary bearing member 130 can provide better supporting force for the rotation movement of the rotary bearing member 130 relative to the non-rotary component 185, and ensure the stability of the overall rotating structure.

In some embodiments of the present invention, the rotary bearing member 130 may be made of metal and coated with an insulating coating inside of the first compartment 145 and the second compartment 150, i.e., on the surface contacted with the conducting fluid 140, to ensure that the conducting fluid 140 in the first compartment 145 and the second compartment 150 are electrically insulated from each other. The insulating coating may include any suitable insulating coating such as an alumina ceramic coating or a ceramic polymer coating. The rotary bearing component 130 of metal structure has higher strength and longer service life, and the required insulation is ensured by the insulating coating.

According to other embodiments of the present invention, the rotary bearing member 130 may be made of insulating plastic, which may include for example, PVC (polyvinyl chloride), PP (polypropylene), PS (polystyrene), PMMA (polymethylmethacrylate), ABS (acrylonitrile butadiene styrene). Since the price and processing cost of plastic are relatively low, the overall price and processing cost of the device can also be reduced when using insulating plastic for the rotary bearing member 130.

In some embodiments of the present invention, the conducting fluid 140 includes a conducting solution or a liquid metal. Among them, the conducting solution may include sodium chloride solution, potassium chloride solution, sodium sulfate solution, sodium hydroxide solution, potassium nitrate solution, etc., and the liquid metal may include hydrargyrum. In other embodiments of the present invention, the liquid metal may include gallium and its alloys. The conducting solution or liquid metal can be selected according to the structure, cost, service environment, service life and other factors, in order to choose the most suitable one as the conducting fluid 140. In addition, in some embodiments of the present invention, the conducting solution or liquid metal can be selected according to the chemical properties of the materials used in the electrical connectors 175, 180, 190, 195 to slow down or avoid reacting with the connector.

According to another aspect of the present invention, there is provided an electric machine 220, referring to FIG. 1-5, the electric machine 220 comprises a rotor 125 and a current transferring device 100 described above. The rotor 125 has a rotor winding 105 and a rotor shaft 135, the rotor shaft 135 includes an inner cavity 230, and the rotor winding 105 has a rotor positive pole 165 and a rotor negative pole 170. The current transferring device 100 for an electric machine includes a rotary bearing member 130 and a non-rotary component 185. The rotary bearing member 130 is fixed inside the inner cavity 230 of the rotor shaft 135 of the electric machine 220 and rotates with the rotor shaft 135. The rotary bearing member 130 includes a first compartment 145 and a second compartment 150. Wherein, as more clearly shown in FIG. 3, the first compartment 145 has a first opening 155 and has a rotor positive connector 175 inside it, and the rotor positive connector 175 is electrically connected to the rotor positive pole 165 through the rotary bearing member 130 and the rotor shaft 135. The first compartment 145 is filled with a conducting fluid 140, and the conducting fluid 140 is in electrical contact with the rotor positive connector 175. The second compartment 150 has a second opening 160 and has a rotor negative connector 180 inside it, and the rotor negative connector 180 is electrically connected to the rotor negative pole 170 through the rotary bearing member 130 and the rotor shaft 135. The second compartment 150 is filled with a conducting fluid 140, and the conducting fluid 140 is in electrical contact with the rotor negative connector 180. Wherein the first compartment 145 are electrically insulated from the second compartment 150, so that the conducting fluid 140 inside the first compartment 145 and the second compartment 150 are insulated and separated. The non-rotary component 185 closes the first opening 155 and the second opening 160, and includes a power positive connector 190 and a power negative connector 195. The power positive connector 190 extends into the first compartment 145 and is in electrical contact with a conducting fluid 140 in the first compartment 145, The power negative connector 195 extends into the second compartment 150 and is in electrical contact with a conducting fluid 140 in the second compartment 150.

It should be understood that all the embodiments, features and advantages described above for the current transferring device 100 for an electric machine according to the present invention are equally applicable to the electric machine 220 according to the invention without conflicting with each other. That is to say, all the embodiments and variants of the current transferring device 100 for an electric machine described above can be directly applied to the electric machine 220 according to the present invention and directly combined with it. For the sake of brevity of the present disclosure, it will not be repeated here.

According to another aspect of the present invention, there is provided a motor vehicle comprising an electric machine 220 as described above. Similarly, all the embodiments, features and advantages described above for the current transferring device 100 for an electric machine and the electric machine 220 according to the invention are equally applicable to the motor vehicle according to the invention.

In general, the present invention proposes a current transferring device 100 for an electric machine, an electric machine 220 with the same and a motor vehicle based on the current transferring technology for an electric machine in the prior art. In contrast to the existing conducting fluid transferring structures, the device 100 is integrated into the rotor shaft, which is more compact and reliable, and can avoid the external influences to the greatest extent.

Where it is technically possible, the technical features listed in relation to different embodiments can be combined with each other to form further embodiment within the scope of the present invention.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "including" is inclusive and has the same scope as "comprising".

The above-mentioned embodiments are possible examples of implementations of the present invention and are given only for the purpose of enabling those skilled in the ark to clearly understand the principles of the invention. It should be understood by those skilled in the ark that the above discussion to any embodiment is only illustrative, and is not intended to imply that the disclosed scope of the embodiments of the present invention (including claims) is limited to these examples; under the overall concept of the invention, the technical features in the above embodiments or different embodiments can be combined with each other to produce many other changes in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

The invention claimed is:

1. A current transferring device for an electric machine comprising:
   a rotary bearing member fixed in a rotor shaft of the electric machine and configured to rotate with the rotor shaft, the rotary bearing member including:
      a first compartment filled with a conducting fluid, the first compartment having a first opening and a rotor positive connector that is in electrical contact with the conducting fluid therein and electrically connected to a rotor positive pole of the electric machine, and
      a second compartment filled with a conducting fluid and electrically insulated from the first compartment, the second compartment having a second opening and a rotor negative connector that is in electrical contact with the conducting fluid therein and electrically connected to a rotor negative pole of the electric machine, wherein the first opening and the second opening face opposite axial directions or a same axial direction; and
   a non-rotary component closing the first and second openings including:
      a power positive connector extending into the first compartment and being in electrical contact with the conducting fluid therein, and
      a power negative connector extending into the second compartment and being in electrical contact with the conducting fluid therein.

2. The current transferring device for an electric machine of claim 1, wherein the rotary bearing member includes a first portion and a second portion separated from each other, the first portion includes the first compartment and has the first opening, and the second portion includes the second compartment and has the second opening.

3. The current transferring device for an electric machine of claim 1, wherein the non-rotary component further includes a closing component abutting edges of the first and second openings, and the power positive connector and the power negative connector extend through the closing component.

4. The current transferring device for an electric machine of claim 3, wherein the non-rotary component further includes fluid sealing structures respectively provided at a junction with the first opening and a junction with the second opening.

5. The current transferring device for an electric machine of claim 3, wherein the non-rotary component further includes a rotary bearing abutting the rotary bearing member.

6. The current transferring device for an electric machine of claim 1, wherein the rotary bearing member is made of metal and coated with an insulating coating on a surface that is in contact with the conducting fluid.

7. The current transferring device for an electric machine of claim 1, wherein the rotary bearing member is made of insulating plastic.

8. The current transferring device for an electric machine of claim 1, wherein the conducting fluid includes a conducting solution or a liquid metal.

9. An electric machine comprising:
a rotor having a rotor winding and a rotor shaft containing an inner cavity, the rotor winding having a rotor positive pole and a rotor negative pole;
a rotary bearing member fixed in the inner cavity and configured to rotate with the rotor shaft, the rotary bearing member including a first compartment filled with a conducting fluid, the first compartment having a first opening and a rotor positive connector that is in electrical contact with the conducting fluid therein and electrically connected with the rotor positive pole,
wherein the rotary bearing member further includes a second compartment filled with a conducting fluid and electrically insulated from the first compartment, the second compartment having a second opening and a rotor negative connector that is in electrical contact with the conducting fluid therein and electrically connected to the rotor negative pole,
wherein the rotary bearing member further includes a non-rotary component including a power positive connector extending into the first compartment and being in electrical contact with the conducting fluid therein, and a power negative connector extending into the second compartment and being in electrical contact with the conducting fluid therein, and
wherein the first opening and the second opening face opposite axial directions or a same axial direction.

10. A motor vehicle comprising the electric machine of claim 9.

11. The electric machine of claim 9, wherein the rotary bearing member further includes a first portion and a second portion separated from each other, the first portion includes the first compartment and has the first opening, and the second portion includes the second compartment and has the second opening.

12. The electric machine of claim 9, wherein the non-rotary component further includes a closing component abutting edges of the first and second openings, and the power positive connector and the power negative connector extend through the closing component.

13. The electric machine of claim 12, wherein the non-rotary component further includes fluid sealing structures respectively provided at a junction with the first opening and a junction with the second opening.

14. The electric machine of claim 12, wherein the non-rotary component further includes a rotary bearing abutting the rotary bearing member.

15. The electric machine of claim 9, wherein the rotary bearing member is made of metal and coated with an insulating coating on a surface that contact with the conducting fluid.

16. The electric machine of claim 9, wherein the rotary bearing member is made of insulating plastic.

* * * * *